3,517,085
DYEABLE COMPOSITIONS COMPRISING POLY-
OLEFIN AND N-VINYL CARBAZOLE-ETHYL-
ENE COPOLYMER
Isoji Taniguchi, Ken-Ichi Maemoto, and Yoshiharu Tat-
sukami, Niihama, and Yoshio Kobayashi, Tomohide
Yasumura and Reizo Yamadera, Shiga-gun, Japan, as-
signors to Sumitomo Chemical Co., Ltd., Higashi-ku,
Osaka, and Toyo Spinning Co., Ltd., Kita-ku, Osaka,
Japan
No Drawing. Filed Feb. 17, 1965, Ser. No. 433,454
Claims priority, application Japan, Feb. 21, 1964,
39/9,696; May 12, 1964, 39/26,822
Int. Cl. D06p 3/02, 5/08
U.S. Cl. 260—895                      5 Claims The present invention relates to improved poly-alpha-olefin composition and, particularly, to poly-alpha-olefin composition having an improved affinity for dyes. More particularly, the invention relates to poly-alpha-olefin composition comprising a copolymer of ethylene and an acrylamide of vinyl carbazole and a polyolefin.

It is known that polyolefins such as crystalline polypropylene, polyethylene, may be molded into fibers, films and other shaped articles which have excellent physical and mechanical properties. These poly-alpha-olefins, however, have some inherent drawbacks which restrict their application to certain shaped articles. For example, since poly-alpha-olefins themselves are hydrophobic and chemically inert, conventional dyeing methods using conventional dyestuffs are inapplicable to these compounds, because they cannot be dyed to deep shades with high fastnesses to sunlight, laundering and dry cleaning.

For the above reason, much studies have been done for many years to improve the affinity of poly-alpha-olefins for conventional dyes and a number of processes have been proposed.

Among these processes, the most outstanding and generally recommended are those in which certain substances having an affinity for particular dyestuffs are added to poly-alpha-olefins. However, the conventional additives employed for such purposes are usually poor in compatibility with poly-alpha-olefins and, when they are admixed with poly-alpha-olefins, a phase separation takes place. Thus, the conventional additives cannot be compatible with poly-alpha-olefins in any other manner than as a coarse dispersion, so that a homogeneous composition can hardly be obtained. When an additive used to improve the dyeability of a poly-alpha-olefin is dispersed in the poly-alpha-olefin in the form of rough or coarse particles, the dyeing efficiency is considerably low as compared with a solid solution or other similar state and, moreover, the whole state adversely affects the process of melt-spinning. For example, the filaments might be cut or broken at the outlet of the spinnerette nozzle, or the overall drawability of the filaments would be jeopardized. Thus, the physical properties of the final fiber would prove unsatisfactory. Moreover, as the filaments are subject to frictional forces upon drawing or other after-treatment, the additive would be migrated itself from the poly-alpha-olefin giving rise to undesirable phenomena such as uneven dyeing.

The polypropylene fiber containing the homopolymer of N-substituted acrylamide was disclosed in Japanese patent publication No. 5,861/1963. This fiber is claimed to have an improved affinity for dyes, improved fastnesses to light and gas, and improved resistances to oxidation and weathering. However, due to the strong polarity of the homopolymer added, the fiber tends to undergo phase separation between the homopolymer and poly-alpha-olefin so that the above-mentioned disadvantages cannot yet be avoided.

In order to overcome the above-mentioned disadvantages of the conventional methods and to improve the affinity for dyes and other properties of poly-alpha-olefins, we have studied a number of possible polyolefin additives and found that when a copolymer of ethylene and an acrylamide compound or N-vinyl carbazole is added to poly-alpha-olefin, the resulting composition meets such requirements and is fully comparable to poly-olefin itself in both physical and mechanical properties and yet, is far superior to polyolefin and dyeability and fastness.

An object of the present invention is to provide homogeneous polyolefin compositions which are least liable to undergo phase-separation and has an improved affinity for dyes. Other objects will be apparent from the following description.

In order to accomplish these objects this invention provides moldable poly-alpha-olefin compositions comprising a poly-alpha-olefin and a copolymer of ethylene and a member selected from the group consisting of N-vinyl carbazole and acrylamide compounds of the following general formula:

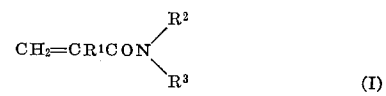
(I)

wherein $R^1$ is a member selected from the group consisting of hydrogen atom and methyl radical, and $R^2$ and $R^3$ each represents a member selected from the group consisting of hydrogen atom and alkyl, cycloalkyl, aralkyl and aryl radicals which have 1 to 18 carbon atoms.

The poly-alpha-olefins which are used as the fundamental component of the present compositions include, for example, polyethylene, polypropylene, polybutene-1, poly-4-methylpentene-1, and the like. The commercial value of the isotactic polypropylene synthesized using the Ziegler-Natta catalyst is particularly enhanced by the embodiment of this invention.

The acrylamide compounds used in the present invention are acrylamides or methacrylamides or the N-substituted derivatives of either of them, and have the general formula (I). Examples of $R^2$ and $R^3$ in the above general formula (I) includes hydrogen, methyl, ethyl, n-propyl, isopropyl, n-butyl, isobutyl, t-butyl, hexyl, octyl, nonyl, lauryl, dodecyl, octadecyl, cyclohexyl, benzl, phenyl, tolyl and the like.

The compounds which are represented by the above general Formula I include, for example, acrylamide, N-methylacrylamide, N,N-dimethylacrylamide, N-ethylacrylamide, N,N-diethylacrylamide, N-n-propylacrylamide, N-isopropylacrylamide, N-isobutylacrylamide, N,N-di-n-butylacrylamide, N-hexylacrylamide, N-octylacrylamide, N-laurylacrylamide, N-octadecylacrylamide, N-cyclohexylacrylamide, N-benzylacrylamide, N-phenylacrylamide, N-methyl-N-phenylacrylamide, N-tolylacrylamide, methacrylamide, N - methylmethacrylamide, N - ethyl methacrylamide, N,N-diethyl methacrylamide, N-n-propyl methacrylamide, N-n-butyl methacrylamide, N,N-di-n-butyl methacrylamide, N-octyl methacrylamide, N-cyclohexyl methacrylamide, N-benzyl methacrylamide, N-phenyl methacrylamide, and the like.

The copolymer of ethylene and N-vinyl carbazole or acrylamide compound of the above general Formula I, which constitutes one of the components of the compositions of the invention, contains 1 to 50, preferably 1 to 20, more preferably 1 to 15 mole percent of acrylamide or vinylcarbazole units and has an intrinsic viscosity of 0.1 to 4.0 dl./g. as measured in xylene solution at 120° C. The copolymers containing only less than 1 mole percent of acrylamide or vinyl carbazole units do not substantially contribute to improvements in dyeability of the poly-alpha-olefin when added to the latter in such suitable quantitative range as will be mentioned hereinafter, and if the amounts of said copolymers were excessively large, the resulting compositions would no longer possess the desirable mechanical characteristics of poly-alpha-olefins, although the affinity of the compositions for dyes might be enhanced. Generally speaking, therefore, such copolymers cannot be used for the purpose of improving the dyeability of poly-alpha-olefins. On the other hand, those copolymers which contain more than 50 mole percent of acrylamide compound or vinyl carbazole units are extremely poor in compatibility with poly-alpha-olefins and, therefore, are not satisfactory for the purpose of improving their dyeability.

While intrinsic viscosity is correlated to molecular weight, the copolymers falling into the above-mentioned viscosity range of 0.1–4.0 di./g. are readily miscible or compatible with poly-alpha-olefins forming substantially homogeneous compositions. It should also be understood that since the copolymers of the described type generally melt at lower temperatures than poly-alpha-olefins, the copolymers whose intrinsic viscosity values fall within the above-mentioned range may safely be employed, but that when poly-alpha-olefins having extremely low melting points are employed, the copolymers are preferably those which melt in the neighborhood of, or below, the melting point of the particular polyolefin used.

The above-mentioned copolymers which constitute a component of the present composition may be produced according to any conventional manner. Thus, for example, ethylene and an acrylamide having the above mentioned general Formula I are allowed to undergo radical copolymerization in gaseous phase and in the presence of a polymerization catalyst which may be selected from the group consisting, for example, of oxygen, organic peroxides, azo compounds, diazo compounds and the like at an ethylene pressure of 500 to 3000 kg./cm$^2$ and at a temperature of 100° C. to 300° C. It is also possible to use the so-called low-pressure method in which ethylene is copolymerized with said acrylamide compound under a low pressure and in the presence of a catalyst such as the Natta catalyst.

In preparing a composition of this invention, it is generally advisable to use about 0.1 to 30 percent by weight of the copolymer based on the weight of the polyolefin. Then, the resulting composition would be substantially homogeneous and have a great affinity for dyes without adversely affecting the desirable mechanical properties of the poly-alpha-olefin.

It is a feature of the compositions of this invention that both greater homogeneity and higher dyeability of the composition are attained at the same time. If the amount of said copolymer is below 0.1% by weight based on the poly-alpha-olefin, the dyeability of the resulting composition would not be as high as practically desirable, while if more than 30% by weight (based on the polyolefin) of the copolymer is used, the composition might lose, in substantial degrees, the desirable characteristics of the poly-alpha-olefin. While it depends on the desired depth of shade, the particularly preferred amount of the copolymer to be added to polyolefin generally ranges from 1 to 15 weight percent for fiber and 1 to 25 weight percent for films and other shaped articles, said amount being based on the weight of the poly-alpha-olefin.

The above-mentioned materials (polyolefin and copolymer) of the present invention may be readily mixed together mechanically to prepare a homogeneous composition, because both materials are highly miscible or compatible. The admixing can thus be performed by means of a Banbury or other suitable mixer at an elevated temperature or, alternatively, by a multistage extruding technique may be utilized to perform the required mixing or blending and extrusion.

In the course of mixing or prior thereto, a suitable poly-alpha-olefin stabilizer, such as antioxidant (e.g., alkylphenol compounds), ultraviolet-absorber (e.g., benzophenone derivatives), heat-resisting stabilizer (e.g., thioether compounds of carboxylic acid ester) and the like may also be added to the compositions without departing from the scope of the present invention.

It has also been found that a further improvement of the composition can be obtained by incorporating thereto an organic metal salt or organic complex salt. While it has already been attempted to improve the dyeability of poly-alpha-olefin by adding thereto an organic metal salt or complex salt, it has been found that deeply dyeable products can only be obtained when a considerably large amount of such salt is employed. Moreover, the fiber formed from such a composition is liable to discolor, causing troubles when it is dyed in white or pale shades. We have found, however, that when an organic metal salt or complex salt is added to the present composition which, as described hereinbefore, comprises poly-alpha-olefin and a copolymer of ethylene and an acrylamide compound of N-vinyl carbazole, highly desirable results can be obtained even by the addition of minute amounts of said salt. It is also a benefit accruing from the addition of such a metal salt or complex salt that the compatibility of poly-alpha-olefin and said copolymer is further improved.

The metal to be used for the stated purpose may be selected from the group consisting of Ca, Mg, Al, Zn, Co, Ni, Ti, Cr, Cu, Fe, Mn, and the like, generally speaking, transition metals and, more specifically, Al, Zn, Co and Ni, are particularly preferred. These metals are added to the present composition in the form of salts or complex salts, and it is sufficient to add these salts in an amount of 0.02 to 1.0% by weight (in terms of the metals involved) based on the poly-alpha-olefin composition. More preferably, the range is from 0.05 to 0.5% by weight. When the above-mentioned metals are added in the form of salts, the salts are preferably the Ni, Al, Co, Zn, and other salts of higher fatty acids, such as stearic acid, lauric acid, palmitic acid, and the like. When said metals are used as organic complex salts, preferable are the organic complex salts of 8-hydroxyquinoline, acetoacetic acid, acetylacetone, thiobisphenols, e.g. 5,5'-octylthiobisphenol,

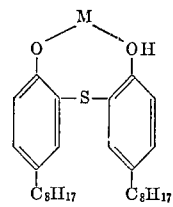

and 2-oxy-5-alkylbenzophenone,

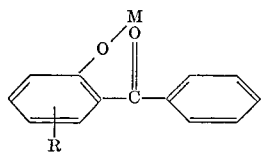

(wherein M is a metal and R is a substituent).

While the compositions of this invention have an excellent affinity for direct dyes, vat dyes, acid dyes, dispersion dyes, reactive dyes, cationic dyes, metallized dyes, and other dyestuffs, they have particular affinity for dispersion dyes and metallized dyes. The above-mentioned dispersion and metallized dyes include, for instance, Sumiplene Yellow G, Sumiplene Red G, Sumiplene Blue G, Celliton Fast Yellow G (C.I. Disperse Yellow 3), Celliton Fast Yellow 5R (C.I. Disperse Yellow 7), Celliton Fast Orange 5R (C.I. Disperse Orange 1), Celliton Fast Red GG (C.I. Disperse Red 171), Celliton Fast Red 4G, Celliton Fast Violet 6B (C.I. Disperse Violet 4), Durand Blue 2G (C.I. Disperse Blue 24), Vialon Fast Yellow G (C.I. Acid Yellow 18), Vialon Fast Red G (C.I. Acid Red 226), Vialon Fast Brown R (C.I. Acid Brown 50), Cibalan Blue BL (C.I. Acid Blue 168), and the like. In addition, the present compositions have high affinity for other dyes, for example, Xylene Fast Yellow P (C.I. Acid Yellow 61), Xylene Fast Blue PR (C.I. Acid Blue 129), Indanthrene Gold Yellow GK (C.I. Vat Yellow 4), Indanthrene Red Violet RH (C.I. Vat Violet 2), Malachite Green (C.I. Basic Green 4), Methylene Blue NS (C.I. Basic Blue 24), Xylene Fast Red P (C.I. Acid Red 118), and the like.

Comparisons of dyeability may be made visually with respect to the shaded of shaped articles, but for added accuracy, measurements may be carried out by means of optical instruments or from the amount of dye adsorbed per unit quantity of the article. Particularly in the case of fiber it is customary to take the proportion of dye adsorption as criteria.

The compositions of this invention are dyeable up to 100 mg./g. within the serviceable range, although the figure varies depending upon the particular type of dye used and the amount of the copolymer present in the composition. Even in the case of the present compositions suited for fiber making, as high as 50 mg./g. of dyeing is possible. Furthermore, the dyed fibers have high fastness to sunlight, laundering and dry cleaning. The homogeneity of the compositions of this invention, as well as the absence of phase separation, may be clearly seen when the dyed film, for instance, is examined with the naked eyes or under a microscope and, when the dyed bundle of filaments is set with epoxy resin and cut, and its cross section is microscopically examined. The fact that the compositions of this invention are substantially homogeneous can also be ascertained when one considers the fact that the mechanical strength of the shaped articles made from the same are almost equal to that of the poly-alpha-olefin used. For example, the strength of the yarn spun from the present composition containing polypropylene and 10% by weight (based on the polypropylene) of ethylene-N,N-dimethyl acrylamide copolymer is virtually identical to the strength of the yarn spun from the polypropylene alone under the same conditions. In contrast, the polypropylene compositions containing similar amounts of conventional additives inevitably degrade 10% or more. Furthermore, the compositions of this invention are superior to conventional similar compositions in mouldability and, in that particularly, when they are formed into fibers, there is a reduced tendency for breaking or the formation of uneven filaments.

It will be apparent from the above description that the compositions of this invention have improved affinities for dyes, yet retaining the desirable mechanical properties of poly-alpha-olefin. It is also to be noted that the compositions are also superior to the material polyolefin in printing qualities. Thus, the films or other large-faced products made of these compositions can be attractively printed. Furthermore, whereas poly-alpha-olefins are electrically insulating by nature and may be charged by friction so easily as to exclude it from some applications, the compositions of this invention are far less electrically chargeable and, therefore, can be safely used in such applications. It is also to be noted that while isotactic polypropylene, for instance, tends to become brittle at low temperatures, the compositions of this invention are far superior in low temperature characteristics and need no consideration as to brittleness at low temperatures in use. When a terpolymer composed of ethylene, N-vinyl carbazole or acrylamide, and one or more of ethylene derivatives such as vinyl acetate, acrylic acid esters and the like is added to poly-alpha-olefin, similar result is obtained to that obtainable by the addition of the above mentioned copolymer.

This invention will be further described by referring to the examples which are given for illustration and not for limitation of the invention in any way.

EXAMPLE 1

Ten percent by weight (based on polypropylene) of a copolymer of ethylene and N,N-dimethyl acrylamide containing 16.3% by weight (based on the copolymer) of N,N-dimethyl acrylamide (0.2 mole percent) and having a melting point of 110° C. and an intrinsic viscosity of 0.93 dl./g. as measured in xylene solution at 120° C. was added to polypropylene powder, and blended. The mixture was extruded into filaments at 210° C., and the filaments were drawn to 4 times their initial length in hot water, and then heat-treated at 120° C. for 30 minutes to prepare a fiber. The resulting fiber had a strength value of 5.3 g./d. and an elongation value of 58.3%. Thus, compared with the corresponding values of 5.5 g./d. and 40.4% for a similar polypropylene fiber containing none of the copolymer, no reduction in strength was observed.

The fiber was dyed in a dyeing bath containing 3% OWF of dispersion dye Duranol Blue 2G, 2% OWF of nonionic surface active agent, and 1% OWF of anionic surface active agent at 100° C. for 1 hour (liquid ratio: 50:1), whereby the fiber was dyed in deep blue shade. The fastness of the fiber to sunlight, laundering, and friction were found to correspond to the JIS 5th grade, and to drycleaning with perchlorethylene correspond to the JIS 4th grade. When the cross section of the dyed fiber was microscopically examined, the copolymer revealed on sign of phase separation the fiber having been uniformly dyed. Then, a plate of 37 x 31 x 2 mm. formed by a hot-press was rubbed with a cotton linnel and the amount of electric charge formed on the plate was measured. It was found that whereas the amount of charge on a polypropylene plate containing none of the copolymer was $-78 \times 10^3$ volts, the corresponding value for the plate was $-3.7 \times 10^3$ volts.

The brittleness points of the product containing the copolymer and the product not containing the copolymer were found to be 7° C. and 18° C., respectively. It is, thus, apparent that the low-temperature brittleness of the fiber is substantially improved by the present invention.

EXAMPLE 2

The fiber produced in a way similar to that of Example 1 was dyed with a dyeing bath containing 3% OWF of metallized dye Vialon Fast Red G, 5% OWF of ammonium hydrogen phosphate, and 2% OWF of nonionic surfactant at 100° C. for 1 hour (liquid ratio: 50:1), whereby the fiber was dyed in red shade. The fastness of the dyed fiber to sunlight, laundering, rubbing and dry cleaning with perchloethylene were found to correspond to the JIS 5th grade.

EXAMPLE 3

Ten percent by weight (based on polypropylene powder) of a copolymer of ethylene and N,N-diethylacrylamide containing 34.4% by weight (based on the copolymer) of N,N-diethylacrylamide units (10.4 mole percent) and having a melting point of 100° C. and an intrinsic viscosity of 1.15 dl./g. as measured in xylene solution at 120° C. was added to polypropylene powder and blended. The mixture was extruded into filaments at 210° C., and the filaments were drawn to 4 times their initial length in hot water, and then heat-treated at 120° C. for 30 minutes to prepare a fiber.

The resulting fiber had a strength value of 5.6 g./d. and an elongation value of 35.6%. Compared with the strength of 5.5 g./d. and elongation of 40.4% for a similar polypropylene fiber containing none of the copolymer, no reduction in strength was noted.

This fiber was dyed with a dyeing bath containing 3% OWF of dispersion dye Sumiplene Red G and 2% OWF of anionic surfactant at 100° C. for 1 hour (liquid ratio: 50:1), whereby the fiber was dyed in very deep red shade. The fastness of the dyed fiber to sunlight, laundering and rubbing were found to correspond to the JIS 5th grade. Its fastness to dry cleaning with perchloroethylene was equivalent to the JIS 4th grade.

Microscopic examination of the cross section of the same dyed fiber revealed no phase separation of the copolymer, the fiber having been uniformly dyed.

EXAMPLE 4

Ten percent by weight (based on polypropylene powder) of a copolymer of ethylene and N,N-dibutyl acrylamide containing 23.7% by weight (based on the copolymer) of N,N-dibutyl acrylamide (3.4 mole percent) and having a melting point of 98° C. and an intrinsic viscosity of 1.24 dl./g. as measured in xylene solution at 120° C. was added to polypropylene powder, and blended. The mixture was extruded into filaments at 210° C., and the filaments were drawn to 4 times their initial length in hot water, and then heat treated at 120° C. for 30 minutes to prepare a fiber.

The fiber prepared as above was dyed with a dyeing bath containing 3% OWF of dispersion dye Cellinton Fast Yellow 5R, 2% OWF of nonionic surfactant at 100° C. for 1 hour (liquid radio: 50:1), whereby the fiber was dyed in very deep yellow shade. The fastness of the dyed fiber to sunlight, laundering and rubbing were found to correspond to the JIS 5th grade. Its fastness to drycleaning with perchloroethylene was equivalent to the JIS 4th grade. Microscopic examination of the cross section of the same dyed fiber revealed no phase separation of the copolymer, the fiber having been uniformly dyed.

EXAMPLE 5

Ten percent by weight (based on polypropylene powder) of a copolymer of ethylene and 14.7% by weight (based on the copolymer) of N-t-butyl acrylamide units (3.7 mole percent) and having an intrinsic viscosity of 1.94 dl./g. as measured in xylene solution at 120° C. was added to polypropylene powder and blended. The mixture was extruded into filaments at 210° C. and the filaments were drawn to 4 times their initial length in hot water, and then heat-treated at 120° C. for 30 minutes. The resulting fiber had a strength value of 5.38 g./d. and an elongation value of 46.6%. When compared with a similar fiber containing none of the copolymer, no reduction in strength was noted.

The fiber was then dyed with a dyeing bath containing 3% OWF of Cibalon Blue BL, 5% OWF of ammonium hydrogen phosphate and 2% OWF of nonionic surfactant at 100° C. for 1 hour (liquid ratio: 50:1), whereby the fiber was dyed in blue shade. The fastness of the dyed fiber to sunlight, laundering, rubbing and dry cleaning with perchloroethylene were found to correspond to the JIS 5th grade.

EXAMPLE 6

The same fiber as that of Example 5 was dyed under the following conditions: 5% OWF of Xylene Fast Red P, 2% OWF of nonionic surfactant, liquid ratio 50:1, 100° C., 1 hour. The fastness of the dyed fiber to sunlight, laundering, rubbing and drycleaning were found to correspond to the JIS 5th grade. Microscopic examination of the cross section of the same fiber revealed no phase separation of the copolymer, the fiber having been uniformly dyed.

EXAMPLE 7

Twenty percent by weight (based on polypropylene powder) of a copolymer of ethylene and acrylamide containing 22% by weight (based on the copolymer) of acrylamide units (10.0 mole percent) and having an intrinsic viscosity of 1.35 dl./g. as measured in xylene solution at 120° C. was added to polypropylene powder and blended. The mixture was extruded into filaments at 210° C., and the filaments were drawn to 4 times their initial length in hot water, and then heat treated at 120° C. for 30 minutes to prepare a fiber. The resulting fiber was dyed in blue shade with a dyeing bath containing 2% OWF of Xylene Fast Blue PR, 5% OWF of acetic acid, and 2% OWF of nonionic surfactant at 100° C. for 1 hour. The fastnesses of the dyed fiber to sunlight, laundering and drycleaning were excellent.

EXAMPLE 8

Ten percent by weight (based on polypropylene) of a copolymer of ethylene and N,N-dioctyl acrylamide containing 24.6% by weight (based on the copolymer) of N,N-dioctyl acrylamide units (3.0 mole percent) and having a melting point of 103° C. and an intrinsic viscosity of 0.81 dl./g. as measured to xylene solution at 120° C. was added to polypropylene powder and blended. The mixture was extruded into filaments at 210° C., and the filaments were drawn to 4 times their initial length in hot water, and then heat-treated at 120° C. for 30 minutes. The resulting fiber was dyed with a dyeing bath containing 3% OWF of dispersion dye Duranol Blue 2G, 2% OWF of nonionic surfactant, and 1% OWF of anionic surfactant at 100° C. for 1 hour (liquid ratio: 50:1), whereby the fiber was dyed in deep blue shade. The fastnesses of the same fiber to sunlight, laundering and rubbing were found to correspond to the JIS 5th grade. Its fastness to drycleaning with perchloroethylene was equivalent to the JIS 4th grade.

EXAMPLE 9

Ten percent by weight (based on polypropylene powder) of a copolymer of ethylene and N-cyclohexyl acrylamide containing 15.4% by weight (based on the copolymer) of N-cyclohexyl acrylamide units (3.3 mole percent) and having a melting point of 110° C. and an intrinsic viscosity of 1.23 dl./g. as measured in xylene solution at 120° C. was added to polypropylene powder, and blended. The mixture was extruded into filaments at 210° C. and the filaments were drawn to 4 times their initial length in hot water, and then heat-treated at 120° C. for 30 minutes. The resulting fiber was dyed with a dyeing bath containing 3% OWF of dispersion dye Celliton Fast Yellow 5R, 2% OWF of anionic surfactant and 2% OWF of nonionic surfactant at 100° C. for 1 hour (liquid ratio: 50:1). The fastnesses of the dyed fiber to sunlight, laundering and friction were found to correspond to the JIS 5th grade. Its fastness to drycleaning with perchloroethylene was equivalent to the JIS 4th grade.

EXAMPLE 10

Ten percent by weight (based on polypropylene powder) of a copolymer of ethylene and N-phenyl acrylamide containing 13.8% by weight (based on the copolymer) of N-phenyl acrylamide units (3.0 mole percent) and having a melting point of 112° C. and an intrinsic viscosity of 0.92 dl./g. as measured in xylene at 120° C. was added to polypropylene powder, and blended. The mixture was extruded into filaments at 210° C. and the filaments were drawn to 4 times their initial length in hot water, and then heat treated at 120° C. for 30 minutes. The same fiber was then dyed in deep red shade with a dyeing bath containing 3% OWF of dispersion dye Sumiplene Red G and 2% OWF of anionic surfactant at 100° C. for 1 hour (liquid ratio: 50:1). The fastnesses of the dyed fiber to sunlight, laundering and rubbing were found to correspond to the JIS 5th grade, its fastness to drycleaning with perchloroethylene being equivalent to the JIS 4th grade.

EXAMPLE 11

Twenty percent by weight (based on polypropylene powder) of a copolymer of ethylene and N,N-dimethyl methacrylamide containing 6.5% by weight (based on the copolymer) of N,N-dimethyl methacrylamide units (1.7 mole percent) and having a melting point of 110° C. and an intrinsic viscosity of 1.24 dl./g. as measured in xylene solution at 120° C. was added to polypropylene powder, and blended. The mixture was extruded into filaments at 210° C. The filaments were drawn to 4 times their initial length in hot water, and then heat treated at 120° C. for 30 minutes. The fiber prepared as described above was dyed with a dyeing bath containing 3% OWF of dispersion dye Celliton Fast Red 4G, 2% OWF of anionic surfactant, and 2% OWF of nonionic surfactant at 100° C. for 1 hour (liquid ratio: 50:1), whereby the fiber was dyed in very deep red shade. The fastnesses of the dyed fiber to sunlight and drycleaning with perchloroethylene were equivalent to the JIS 4th grade. Microscopic examination of the cross section of the same fiber revealed no phase separation of the copolymer, the fiber having been uniformly dyed.

EXAMPLE 12

Five percent by weight (based on polypropylene powder) of a copolymer of ethylene and N,N-dimethyl acrylamide containing 21.0% by weight (based on the copolymer) of N,N-dimethyl acrylamide units (7.0 mole percent) and having a melting point of 110° C. and an intrinsic viscosity of 0.5 dl./g. as measured in xylene solution at 120° C. and 1% by weight (based on polypropylene powder) of nickel stearate were added to polypropylene powder, and blended. The resulting mixture was extruded into filaments at 210° C. and the filaments were drawn to 4 times their initial length in hot water, and then heat treated at 120° C. for 30 minutes to prepare a fiber. The resulting fiber had a strength value of 5.5 g./d. and an elongation of 56.5% and its reduction in strength could not be observed as compared with corresponding values for a similar polypropylene fiber which does not contain the copolymer and the nickel stearate.

The fiber prepared as above described was dyed with a dyeing bath containing 2% OWF of nonionic surfactant, 2% OWF of anionic surfactant, 1% OWF of acetic acid and dispersion dye represented by the following formula,

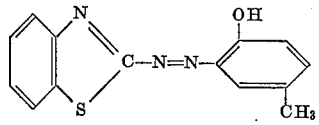

at 100 C. for 1 hour (liquid ratio: 50:1), whereby the fiber was dyed in deep green shade. The fastnesses of the dyed fiber to sunlight, laundering, rubbing and dry cleaning with perchloroethylene were found to be equal to the JIS 5th grade, respectively.

EXAMPLE 13

To a solution of 1 part by weight of N-vinyl carbazole in 25 parts by weight of pure benzene, 0.2 part by weight of azoisobutylonitrile was added and stirred. Thirty parts by weight of ethylene was introduced therein and allowed to copolymerize under a pressure of 1400 kg./cm.$^2$ at a temperature of 110° C. for 3 hours. The resulting copolymer had a melting point of 101° C., an intrinsic viscosity of 1.22 dl./g. as measured in xylene solution at 120° C. and a N-vinyl carbazole content of 20.1% by weight (3.6 mole percent) based on the weight of the copolymer.

Ten percent by weight (based on polypropylene powder) of the copolymer prepared as described above was added to polypropylene powder, and blended. The resulting mixture was extruded into filaments at 210° C. and the filaments were drawn to 4 times their initial length in hot water, and then heat treated at 120° C. for 30 minutes to prepare a fiber.

The fiber was dyed in a dyeing bath containing 2% OWF of metallized dye Cibalan Red 2GL (C.I. Acid Red 211, trademark of Ciba Ltd.) and 3% OWF of ammonium acetate at 100° C. for 1 hour (liquid ratio: 50:1), whereby the fiber was dyed in attractive red shade.

The same fiber dyed in a dyeing bath containing 5% OWF of metallized dispersion dye Vialon Navy Blue R (trademark of B.A.S.F.) and 3% OWF of ammonium acetate at 100° C. for 1 hour (liquid ratio: 50:1), whereby the fiber was dyed in deep blue shade.

The fastnesses of both dyed fibers to sunlight were found to correspond to the JIS 5th grade, respectively. Their fastnesses to laundering were equivalent to the JIS 4th–5th grade, respectively.

What we claim is:

1. A mouldable polyolefin composition comprising a polyolefin that is a polymer of an α-monoolefin containing from 2 to 6 carbon atoms and a copolymer of ethylene and N-vinyl carbazole, said copolymer having an ethylene monomer content of 99–50 mol percent, said copolymer being blended with the polyolefin in an amount of 0.1–30% by weight based on the polyolefin, and said copolymer having an intrinsic viscosity of 0.1 to 4 dl./g. as measured in xylene at 120° C.

2. A mouldable polyolefin composition as claimed in claim 1 wherein the polyolefin is polypropylene.

3. A mouldable polyolefin composition as claimed in claim 1 wherein the content of N-vinyl carbazole in the copolymer is 1 to 15 mol percent.

4. A mouldable polyolefin composition as claimed in claim 1, which further contains a member selected from the group consisting of organic metal salts and organic metal complex salts, the content of said salt being 0.02 to 1.0% based upon the weight, in terms of the metal involved of the polyolefin.

5. A polypropylene fiber having an excellent affinity for dispersion dyes and metallized dyes formed from the composition of claim 1.

References Cited

UNITED STATES PATENTS

| | | | |
|---|---|---|---|
| 2,436,256 | 2/1948 | Hanford et al. | 260—88.1 |
| 3,361,843 | 1/1968 | Miller et al. | 260—857 |
| 3,131,173 | 4/1964 | Mortimer | 260—94.9 |
| 3,156,743 | 11/1964 | Coover et al. | 260—897 |
| 3,163,492 | 12/1964 | Thomas | 8—55 |
| 3,240,552 | 3/1966 | Joyner et al. | 8—39 |
| 3,300,548 | 1/1967 | Baum et al. | 260—897 |
| 3,388,190 | 6/1968 | Bryant et al. | 260—897 |
| 3,395,198 | 7/1968 | Taniguchi et al. | 260—897 |
| 3,405,200 | 10/1968 | Yasumura et al. | 260—897 |
| 3,437,620 | 4/1969 | Yamamoto et al. | 260—23 |

DONALD E. CZAJA, Primary Examiner

R. A. WHITE, Assistant Examiner

U.S. Cl. X.R.

8—55; 260—23, 94.9, 897